(12) United States Patent
Kim et al.

(10) Patent No.: US 10,861,408 B2
(45) Date of Patent: Dec. 8, 2020

(54) LIQUID CRYSTAL DISPLAY DEVICE AND METHOD FOR DRIVING THE SAME

(71) Applicant: SAMSUNG DISPLAY CO., LTD., Yongin-si (KR)

(72) Inventors: Jong Man Kim, Yongin-si (KR); Dong Hyun Yeo, Yongin-si (KR); Byung Kil Jeon, Yongin-si (KR); Yong Bum Kim, Yongin-si (KR); Woo Jung Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/259,565

(22) Filed: Jan. 28, 2019

(65) Prior Publication Data
US 2019/0392777 A1     Dec. 26, 2019

(30) Foreign Application Priority Data

Jun. 25, 2018 (KR) ........................ 10-2018-0072930

(51) Int. Cl.
*G09G 3/36* (2006.01)
*G02F 1/133* (2006.01)

(52) U.S. Cl.
CPC ....... *G09G 3/3688* (2013.01); *G02F 1/13306* (2013.01); *G09G 3/3607* (2013.01); *G09G 2320/0252* (2013.01); *G09G 2320/041* (2013.01)

(58) Field of Classification Search
CPC ........ G02F 1/13306; G09G 2320/0252; G09G 2320/041; G09G 3/3607; G09G 3/3688; G09G 3/3648; G09G 3/36; G09G 3/3659; G09G 3/3611; G09G 3/3208
See application file for complete search history.

(56) References Cited

U.S. PATENT DOCUMENTS

| | | | |
|---|---|---|---|
| 9,640,131 B2 | 5/2017 | Croxford | |
| 2003/0179175 A1* | 9/2003 | Shigeta | ............... G09G 3/3648 345/101 |
| 2006/0092110 A1* | 5/2006 | Park | ..................... G09G 3/3648 345/87 |

(Continued)

FOREIGN PATENT DOCUMENTS

| KR | 10-1336629 | 11/2013 |
|---|---|---|
| KR | 1020150093592 | 8/2015 |
| KR | 10-2019-0045439 | 5/2019 |

*Primary Examiner* — Richard J Hong
(74) *Attorney, Agent, or Firm* — F. Chau & Associates, LLC

(57) ABSTRACT

A liquid crystal display device includes: a display panel including a plurality of pixels for displaying an image; a temperature sensor for sensing a temperature; an image data corrector for calculating correction parameters based on a grayscale change, calculating temperature parameters based on preset reference temperatures and the correction parameters, and correcting current image data to provide corrected image data based on the correction parameters and the temperature parameters; and a data driver for converting the corrected current image data into a data voltage and supplying the data voltage to the display panel. At least one of the correction parameters has a value that varies linearly with the sensed temperature and is based in part on the temperature parameters.

20 Claims, 9 Drawing Sheets

(56) References Cited

U.S. PATENT DOCUMENTS

| | | | |
|---|---|---|---|
| 2006/0158415 A1* | 7/2006 | Izumi | G09G 3/3648 345/98 |
| 2007/0182694 A1* | 8/2007 | Lee | G09G 3/3648 345/101 |
| 2007/0222726 A1* | 9/2007 | Chen | G09G 3/3611 345/87 |
| 2008/0238910 A1* | 10/2008 | Klompenhouwer | G09G 3/3648 345/214 |
| 2010/0134392 A1* | 6/2010 | Sumi | G09G 3/3648 345/87 |
| 2011/0096105 A1* | 4/2011 | Park | G09G 3/36 345/690 |
| 2011/0279466 A1* | 11/2011 | Park | G09G 3/3648 345/581 |
| 2012/0299971 A1* | 11/2012 | Hotelling | G09G 3/3659 345/690 |
| 2013/0120233 A1* | 5/2013 | Jeon | G09G 3/36 345/101 |
| 2014/0104265 A1* | 4/2014 | Park | G09G 3/3648 345/214 |
| 2014/0176403 A1* | 6/2014 | Inoue | G09G 3/3208 345/77 |
| 2018/0277047 A1* | 9/2018 | Dai | G09G 3/36 |
| 2019/0122627 A1 | 4/2019 | Kim et al. | |

* cited by examiner

LIQUID CRYSTAL DISPLAY DEVICE AND METHOD FOR DRIVING THE SAME

CROSS-REFERENCE TO RELATED APPLICATION

The present application claims priority under 35 U.S.C. § 119(a) to Korean patent application 10-2018-0072930 filed on Jun. 25, 2018 in the Korean Intellectual Property Office, the entire disclosure of which is incorporated by reference herein.

BACKGROUND

1. Technical Field

The present disclosure generally relates to display devices, and more particularly, to liquid crystal display devices and methods for driving the same.

2. Discussion of Related Art

In a liquid crystal display (LCD) device, an electric field is generated in a liquid crystal layer by applying a voltage between two electrodes. The transmittance of light passing through the liquid crystal layer is controlled by controlling the intensity of the electric field, enabling the LCD device to display a desired image. To prevent a deterioration phenomenon occurring when an electric field in one direction is applied to the liquid crystal layer for a long period of time, the polarity of a data voltage with respect to a common voltage is reversed for each frame row or pixel.

As modern LCD devices are widely used as display devices for computers and televisions, they need to meet requisite performance requirements for today's high quality moving pictures. However, the liquid crystals of existing LCD devices have a low response speed, for which compensation may be needed to achieve acceptable display quality of a moving picture.

That is, since the response speed of liquid crystal molecules is slow, a certain time is required until a data voltage charged in a liquid crystal capacitor reaches a target voltage, i.e., a voltage at which a desired luminance can be obtained. This time varies depending on a difference between the target voltage and a previous voltage (of a previous frame) charged in the liquid crystal capacitor. For example, if only the target voltage is applied from the start of a data reception interval for the pixel, when the difference between the target voltage and the previous voltage is large, the data voltage may not reach the target voltage during a time for which the pixel's switching element is turned on.

Accordingly, to solve this problem by using a driving method without any physical change of liquid crystals, a dynamic capacitance compensation (DCC) method (data voltage overdrive driving method) has been proposed. The DCC method leverages the phenomenon of the charging speed of a liquid crystal capacitor increasing when the voltage applied across the liquid crystal capacitor increases. The time taken until the voltage charge in the liquid crystal capacitor reaches a target voltage is reduced by increasing a data voltage applied to the pixel (or a difference between a previous data voltage and a current data voltage) to a level higher than the target voltage.

SUMMARY

Embodiments provide a liquid crystal display device for correcting image data, using a correction parameter that is varied linearly with temperature.

Embodiments also provide a method for driving the liquid crystal display device.

According to an aspect of the present disclosure, there is provided a liquid crystal display device including: a display panel including a plurality of pixels for displaying an image; a temperature sensor configured to sense a temperature; an image data corrector circuit configured to calculate correction parameters based on a grayscale change, calculate temperature parameters based on preset reference temperatures and the correction parameters, and correct current image data to thereby provide corrected image data based on the correction parameters and the temperature parameters; and a data driver configured to convert the corrected current image data into a data voltage and supply the data voltage to the display panel, where at least one of the correction parameters has a value that varies linearly with the sensed temperature and is based in part on the temperature parameters.

Under the same grayscale change condition, a variation of the data voltage according to the grayscale change may decrease when the sensed temperature increases.

The correction image data may be generated based on overdrive setting data in the form of a cubic function that uses the correction parameters as coefficients and the current image data as a variable.

The image data corrector may include: a reference determiner configured to determine a reference grayscale and two default grayscales corresponding to the reference grayscale, and determine reference overdrive grayscales respectively corresponding to a first grayscale change and a second grayscale change with respect to each of preset first to third reference temperatures; a first calculator configured to calculate first to fourth correction parameters included in the overdrive setting data, based on a change from the reference grayscale to the default grayscales, the first grayscale change, and the second grayscale change, at the first reference temperature; and a second calculator configured to convert the third correction parameter into a linear function with respect to temperature, which has the temperature parameters as coefficients.

The first correction parameter, the second correction parameter, and the fourth correction parameter may be determined as constants. The third correction parameter may be linearly changed depending on the sensed temperature.

The first grayscale change may correspond to a change from the reference grayscale corresponding to previous image data to a preset first current grayscale, and the second grayscale change may correspond to a change from the reference grayscale to a second current grayscale different from the first current grayscale.

The second calculator may calculate the third correction parameter, based on the reference overdrive grayscales of the first and second grayscale changes corresponding to each of the second and third reference temperatures, and calculate the temperature parameters, based on a relationship between changes of the third correction parameter depending on temperature.

The correction image data may be calculated by the overdrive setting data that has, as a coefficient, the third correction parameter derived from the first, second, and fourth correction parameters and the temperature parameters, and has the current image data and the sensed temperature as variables.

The image data corrector may further include a corrector configured to generate the correction image data by applying the sensed temperature and the current image data to the overdrive setting data.

The image data corrector may further include a memory configured to store the first, second, and fourth correction parameters and the temperature parameters.

The memory may store an additional overdrive grayscale corresponding to a third grayscale change.

The third grayscale change may correspond to a change from a second reference grayscale different from the first reference grayscale to a preset third current grayscale.

The image data corrector may further include a function shifter configured to shift the overdrive setting data, based on a difference between the first reference grayscale and the second reference grayscale and a difference between an overdrive grayscale generated by the overdrive setting data and the additional overdrive grayscale.

The default grayscales may be a first default grayscale equal to the reference grayscale and a second default grayscale that is the maximum grayscale of the display panel.

The reference overdrive grayscales with respect to the default grayscales may be equal to the first and second default grayscales, respectively.

According to another aspect of the present disclosure, there is provided a method for driving a liquid crystal display device, the method including: determining a reference grayscale and two default grayscales corresponding to the reference grayscale, and determining reference overdrive grayscales respectively corresponding to a first grayscale change from the reference grayscale and a second grayscale change from the reference grayscale with respect to each of preset first to third reference temperatures; calculating first to fourth correction parameters included in a function to compute overdrive setting data, based on the reference overdrive grayscales corresponding to the first reference temperature; re-calculating the third correction parameter at each of the second reference temperature and the third reference temperature, based on the reference overdrive grayscales corresponding to each of the second reference temperature and the third reference temperature, the first correction parameter, the second correction parameter, and the fourth correction parameter; and calculating the overdrive setting data for correcting current image data by converting the third parameter at each of the first to third reference temperatures into a linear function with respect to temperature, the linear function including temperature parameters as coefficients.

The first correction parameter, the second correction parameter, and the fourth correction parameter may be constants irrelevant to a temperature change, and the overdrive setting data may be calculated in the form of a cubic function having the current image data as a variable.

The method may further include shifting the overdrive setting data, based on a difference between an additional overdrive grayscale corresponding to a third grayscale change and an overdrive grayscale generated by the overdrive setting data.

The method may further include: sensing a temperature; generating correction image data by applying the sensed temperature, previous image data, and current image data to the overdrive setting data; and converting the correction image data into a data voltage.

Under the same grayscale change condition, a variation of the data voltage according to the grayscale change may decrease when the sensed temperature increases.

In embodiments of a liquid crystal display device and a method for driving the same according to the present disclosure, an optimum overdrive grayscale (and an optimum overdrive data voltage) may be dynamically calculated according to a temperature and a grayscale change, using only a reference overdrive grayscale determined through measurements performed minimum times. Thus, lookup tables for temperature compensation may be omitted, and only a simple algorithm may be embedded in a memory of the display device. Accordingly, the amount of memory allocated for DCC driving may be reduced. Further, image data may be corrected to achieve optimization at all temperatures within a temperature range by calculating a parameter that varies linearly with temperature.

Further, a measuring process for temperature compensation during the manufacturing process of the liquid crystal display device may be markedly simplified, and a process of generating lookup tables is omitted, leading to improved productivity.

BRIEF DESCRIPTION OF THE DRAWINGS

The above and other aspects and features of the inventive concept will become apparent by describing in detail example embodiments thereof with reference to the accompanying drawings, in which like reference characters refer to like elements or operations, wherein.

DETAILED DESCRIPTION

Hereinafter, exemplary embodiments of the present disclosure will be described in more detail with reference to the accompanying drawings; however, they may be embodied in different forms and the inventive concept shall not be construed as limited to the embodiments set forth herein. Rather, these embodiments are provided so that this disclosure will be thorough and complete, and will fully convey the scope of the example embodiments to those skilled in the art.

Figure 1:
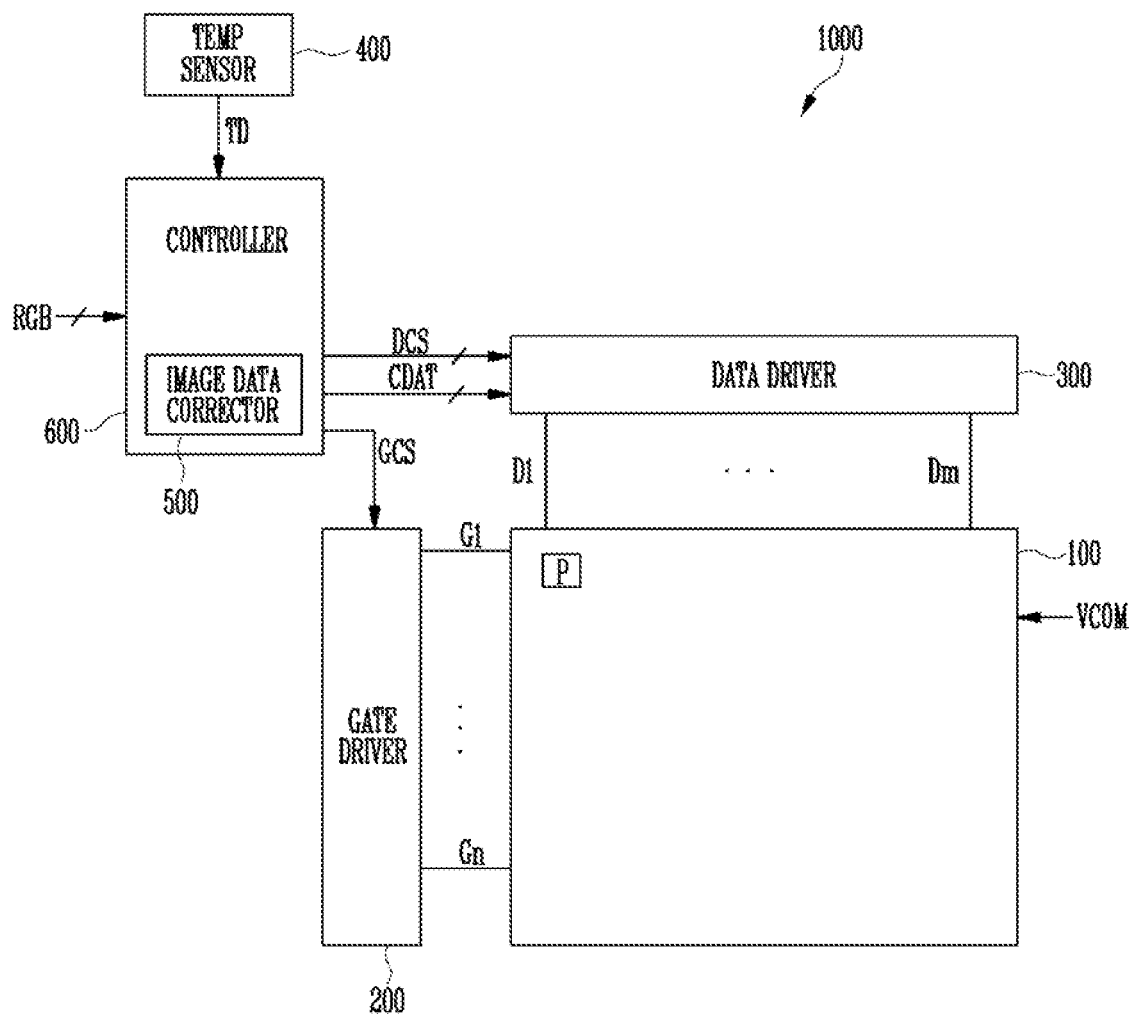
FIG. 1 is a block diagram illustrating a liquid crystal display device according to an embodiment of the present disclosure.
Figure 2:
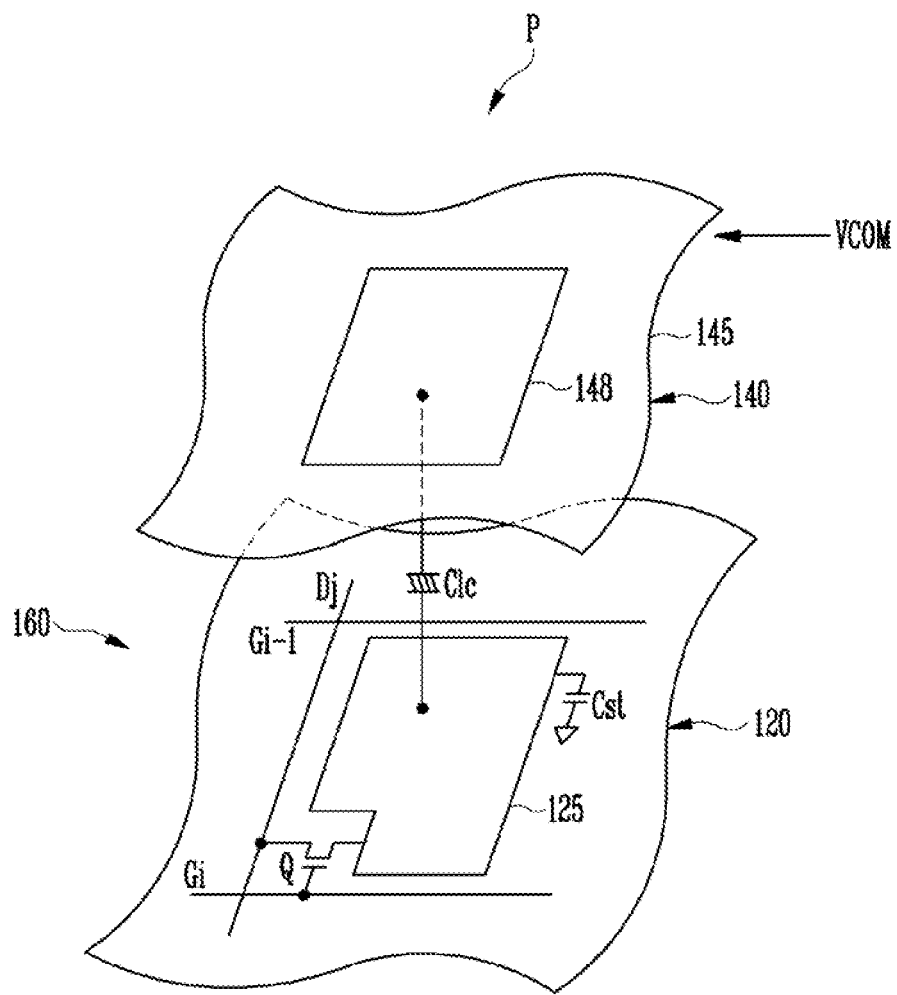
FIG. 2 is an equivalent circuit diagram/perspective view illustrating an example of a pixel included in the liquid crystal display device of FIG. 1.

FIG. 1 is a block diagram illustrating a liquid crystal display (LCD) device according to an embodiment of the present disclosure. FIG. 2 is an equivalent circuit diagram/perspective view illustrating an example of a pixel included in the liquid crystal display device of FIG. 1.

Referring to FIGS. 1 and 2, the liquid crystal display device 1000 may include a display panel 100, a gate driver 200, a data driver 300, a temperature sensor 400, an image data corrector 500, and a controller 600.

The display panel 100 may include a plurality of gate lines G1 to Gn, a plurality of data lines D1 to Dm, and a plurality of pixels P connected to the gate lines G1 to Gn and the data lines D1 to Dm (n and m are natural numbers).

Each pixel P may include a switching element Q connected to a corresponding one of the gate lines G1 to Gm and a corresponding one of the data lines D1 to Dm, a liquid crystal capacitor Clc connected thereto, and a storage capacitor Cst. The storage capacitor Cst may be omitted in some embodiments.

The switching element Q such as a thin film transistor may be provided in a lower display plate 120. A first electrode of the switching element Q may be connected to a data line Dj (j is a natural number from 1 to m), and a second electrode of the switching element Q may be connected to the liquid crystal capacitor Clc and the storage capacitor Cst. A gate electrode of the switching element Q may be connected to a gate line Gi (i is a natural number from 1 to n).

The liquid crystal capacitor Clc may have a pixel electrode 125 of the lower display plate 120 and a common electrode 145 of an upper display plate 140 as two terminals, and a liquid crystal layer 160 between the pixel electrode 125 and the common electrode 145 may serve as a dielectric. The pixel electrode 125 may be connected to the switching element Q. The common electrode 145 may be formed on the entire surface of the upper display plate 140, and is applied with a common voltage VCOM. In an alternative embodiment, the common electrode 145 may be provided in the lower display plate 120. At least one of the pixel electrode 125 and the common electrode 145 may be formed in a linear shape or bar shape.

Meanwhile, to implement color display, an image may be displayed when each pixel P uniquely displays one of primary colors (spatial division) or when each pixel P temporally and alternately displays primary colors (temporal division). FIG. 2 is an example of the spatial division, and each pixel P may include a color filter 148 of red, green or blue, which is provided in a region overlapping the pixel electrode 125. In an embodiment, the color filter 148 may be formed above or under the pixel electrode 125 of the lower display plate 120.

A polarizer (not shown) for polarizing light may be disposed on an outer surface of at least one of the two display plates 120 and 140 of the display panel 100.

The gate driver 200 may be connected to the gate lines G1 to Gn of the display panel 100. The gate driver 200 may provide a gate signal to the gate lines G1 to Gn in response to a gate control signal GCS applied from the controller 500.

The data driver 300 may be connected to the data lines D1 to Dm of the display panel 100. The data driver 300 may receive a data control signal DCS and digital image data (correction image data) CDAT from the controller 600 and/or the image data corrector 500, The corrected image data is RGB image data, applied to controller 600, that may have been converted ("corrected") to a different grayscale value, that is, an "overdrive grayscale". This overdrive grayscale value may correlate to a higher voltage (an overdrive grayscale voltage) applied to the pixel than that for an original (current) grayscale value. With the higher voltage, the response speed of the pixel will be faster and a target luminance value will be reached sooner. The overdrive grayscale voltage may only be applied to a pixel electrode during a beginning portion of a period over which the pixel electrode receives voltage from a data line, and thus may be understood as overshoot or "boost" voltage. The overdrive grayscale is determined based in part on the sensed temperature, and thus the "correction" between the original grayscale and the overdrive grayscale is a temperature based correction. The data driver 300 may convert the correction image data CDAT (interchangeably, "corrected image data") into an analog data voltage, and provide the data voltage to the data lines D1 to Dm.

Each of the gate driver 200 and the data driver 300 may be mounted on the display panel in the form of a driving integrated circuit chip, or mounted on a flexible printed circuit board (FPCB) to be attached to the display panel 100 in the form of a tape carrier package (TCP). Alternatively, the gate driver 200 and/or the data driver 300 may be integrated on the display panel 100.

The temperature sensor 400 may sense a temperature of the display panel 100, and supply the sensed temperature TD to the controller 600 or the image data corrector 500. In an embodiment, the temperature sensor 400 may be mounted as a separate sensor in the display panel 100. The temperature sensor 400 may be implemented with a thin film transistor mounted in the display panel 100. In the latter case, the temperature sensor 400 may output the sensed temperature TD based on a leakage current of the thin film transistor.

The controller 600 may receive a plurality of control signals of input image data RGB, e.g., a vertical synchronization signal, a horizontal synchronization signal, a main clock, a data enable signal, and the like from an external graphic source, etc. The controller 600 may control driving of the gate driver 200, the data driver 300, and the image data corrector 500.

The image data corrector 500 may correct the input image data RGB, based on values of the input image data RGB and the sensed temperature TD. The correction image data CDAT may be provided to the data driver 300. The image data corrector 500 may correct the input image data RGB to improve the response speed of liquid crystals, based on a difference (e.g., a grayscale difference) between image data of a previous frame and image data of a current frame and the sensed temperature TD.

The image data corrector 500 may correct image data, using a dynamic capacitance compensation (DCC) method (also called a data voltage overdrive driving method). A related art DCC method is implemented with an application specific integrated circuit (ASIC), and may store correction reference data (or overdrive setting data) in a lookup table having a size of 17×17 (or 9×9) due to a capacity limitation of a memory. The related art DCC method corrects image data of a 256×256 combination for selection of grayscale values between 0 and 255 for a pixel in each of the previous frame and the current frame. This method may use interpolation between values of the smaller sized look-up tables to obtain a current overdrive grayscale value within the 256× 256 combination.

Meanwhile, since reaction of the liquid crystals with respect to a data voltage varies depending on temperature, an image signal may be corrected more accurately when a relatively high data voltage is applied when the temperature is low, and a relatively low data voltage is applied when the temperature is high, with respect to the same grayscale change. In a related art method, temperature compensation is performed by providing a plurality of lookup tables corresponding to a plurality of basic correction temperatures and searching for a lookup table corresponding to a temperature sensed by a temperature sensor. For example, lookup tables with temperature data at an interval of 2° C. within a range of 10° C. to 40° C. are stored and used.

However, in this related art temperature compensation method, a large number of lookup tables are stored, and therefore the capacity of a memory decreases. In addition, measurements and experiments performed a minimum of, e.g., 4000 times are typical so as to generate lookup tables corresponding to a certain range of operating temperatures. Hence, the related art method is a burden on memory capacity and results in diminished productivity.

The image data corrector 500 according to an embodiment of the present disclosure may calculate correction parameters, based on a preset reference temperature and a grayscale change, and calculate temperature parameters based on the correction parameters and a sensed temperature. The image data corrector 500 may generate overdrive setting data, using the correction parameters and the temperature parameters, and generate correction image data CDAT by correcting a grayscale value of current image data, based on the overdrive setting data. The overdrive setting data is data for correcting the current image data through DCC driving. In other words, the overdrive setting data may determine an overdrive grayscale (i.e., a corrected grayscale), based on the current image data and the sensed temperature TD. The overdrive setting data may be shifted by a predetermined method (discussed later with respect to FIG. 6) according to a grayscale (e.g., a reference grayscale) of previous image data.

The correction image data CDAT may be generated based on overdrive setting data in the form of a cubic function, which uses the correction parameters as coefficients and uses the current image data as a variable. In an embodiment, the overdrive setting data may be stored in the form of a function or lookup table in the image data corrector 500. In an embodiment, the overdrive setting data may be implemented through a software and/or hardware configuration for outputting a cubic function. Here, "software configuration" refers to a processor (hardware circuitry) that has loaded software instructions and is thereby configured to execute the software instructions.

Driving of the image data corrector 500 and a method for extracting the overdrive setting data will be described with reference to FIGS. 3 to 9.

In an embodiment, in a manufacturing process of the liquid crystal display device 1000, the image data corrector 500 may calculate and store the overdrive setting data through measurements and experiments of overdrive driving under predetermined temperature conditions. The image data corrector 500 may change the overdrive setting data to correspond to a temperature change and a grayscale change during the use of the liquid crystal display device 1000. For instance, the image data corrector 500 may re-calculate and update the overdrive setting data according to a user setting during the use of the liquid crystal display device as a completed product. For example, when overdrive grayscales respectively corresponding to a plurality of reference temperatures are input, the image data corrector 500 may update and store the overdrive setting data.

Figure 3:
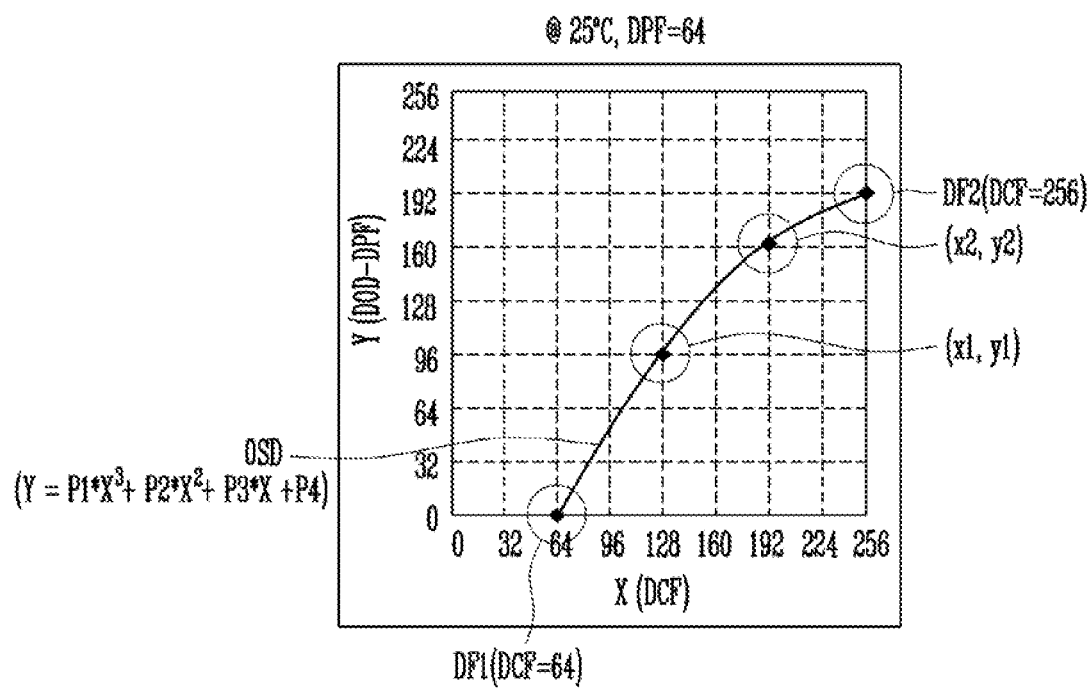
FIG. 3 is a graph illustrating an example of calculating overdrive setting data for image data correction.

FIG. 3 is a graph illustrating an example of calculating overdrive setting data for image data correction.

Referring to FIGS. 1 and 3, the image data corrector 500 may calculate overdrive setting data OSD corresponding to a first reference temperature and a reference grayscale DPF. Note that the first reference temperature of 25° C. and the reference grayscale DPF of grayscale 64 in FIG. 3 are merely examples, and that other suitable values may be alternatively substituted.

The reference grayscale DPF may be a grayscale value included in image data of a previous frame.

The overdrive setting data OSD may be expressed by a functional formula that satisfies the response speed of liquid crystals with respect to a combination of previous image data (i.e., the reference grayscale DPF) and current image data (i.e., a current reference grayscale DCF), and may be determined through an experiment, etc, to be stored in the liquid crystal display device 1000.

In an embodiment, the overdrive setting data OSD may be calculated based on the reference grayscale DPF corresponding to a fixed grayscale of the previous image data, two default grayscales DF1 and DF2 corresponding to the current image data, and reference overdrive grayscales DOD respectively corresponding to a first grayscale change and a second grayscale change. The first grayscale change may correspond to a change from the reference grayscale DPF to a preset first current grayscale x1, and the second grayscale change may correspond to a change from the reference grayscale DPF to a preset second current grayscale x2.

At the first reference temperature, each of the following may be a previously stored value(s):
(i) the reference grayscale DPF;
(ii) the default grayscales DF1 and DF2;
(iii) reference default overdrive grayscales corresponding to the default grayscales DF1 and DF2;
(iv) the first current grayscale x1;
(v) a first reference overdrive grayscale corresponding to the first current grayscale x1;
(vi) the second current grayscale x2; and,
(vii) a second reference overdrive grayscale corresponding to the second current grayscale x2.

The reference grayscale DPF, the first current grayscale x1, the first reference overdrive grayscale, the second current grayscale x2, and the second reference overdrive grayscale may be values determined through an experiment, etc., and the default grayscales DF1 and DF2 and the default reference overdrive grayscales may be values automatically determined by specifications of the liquid crystal display device 1000 and the reference grayscale DPF.

The stored values may be determined by a reference determiner (e.g. a logic circuit or a processing circuit) included in the image data corrector 500, and may be recorded in a memory.

Hereinafter, as shown in FIG. 3, to facilitate an understanding of the inventive concept, an example is given in which the reference grayscale DPF is the grayscale 64, the first default grayscale DF1 is the grayscale 64, the second default grayscale DF2 is grayscale 256 (maximum grayscale), the first current grayscale x1 is grayscale 128, and the second current grayscale x2 is grayscale 192. In addition, the first reference overdrive grayscale DOD corresponding to the first current grayscale x1 may be set as grayscale 160 (derived from DOD−64=96 in FIG. 3), and the second reference overdrive grayscale DOD corresponding to the second current grayscale x2 may be set as grayscale 224 (derived from DOD−64=160 in FIG. 3). For example, when the previous image data is the grayscale 64 and the current image data is the grayscale 128 under the condition of 25° C., the current image data may be corrected to the grayscale 160, which is an overdrive grayscale DOD. When the previous image data is the grayscale 64 and the current image data is grayscale 192 under the condition of 25° C., the current image data may be corrected to the grayscale 224, which is an overdrive grayscale DOD.

In an embodiment, the first and second default reference overdrive grayscales may be set as the reference grayscale DPF and the maximum grayscale, respectively. In this case, since the first default grayscale DF1 is set equal to the reference grayscale DPF, it is unnecessary to overdrive the first default grayscale DF1. In addition, since the second default grayscale DF2 is set as the maximum grayscale (grayscale 256 in FIG. 3) of the display panel 100, the second default grayscale DF2 corresponds to the maximum data voltage, and cannot be overdriven. For example, the first default grayscale DF1 may be equal to the first default reference overdrive grayscale, and the second default grayscale DF2 may be equal to the second default reference overdrive grayscale.

The overdrive setting data OSD may be a cubic function with correction parameters as coefficients and with the current image data as a variable. In an embodiment, the overdrive setting data OSD at the first reference temperature may be expressed by the following Equation 1.

$$Y=P1*X^3+P2*X^2+P3*X+P4, \qquad \text{Equation 1:}$$

where Y is a difference (DOD−DPF) between the overdrive grayscale DOD and the reference grayscale DPF, X is a grayscale value of the current image data, and P1, P2, P3, and P4 are correction parameters (note that the symbol * herein denotes multiplication). Since the reference grayscale DPF is a constant, the overdrive grayscale DOD may be calculated by the current image data.

As described above, four coordinates (DF1, 0), (x1, y1), (x2, y2), and (DF2, 192) may be stored with respect to the reference grayscale DPF and the first reference temperature, and therefore the correction parameters P1 to P4 of Equation 1 may be extracted as constants (by solving for four equations with four unknowns, i.e., four instances of eqn. (1) where both Y and X are known in each instance). First to fourth correction parameters P1 to P4 may correspond to coefficients of respective terms of the cubic function that expresses the overdrive setting data OSD. For example, the first correction parameter P1 is a coefficient of a tertiary term, the second correction parameter P2 is a coefficient of a secondary term, the third correction parameter P3 is a coefficient of a primary term, and the fourth correction parameter is a coefficient of a constant term.

Figure 4A:
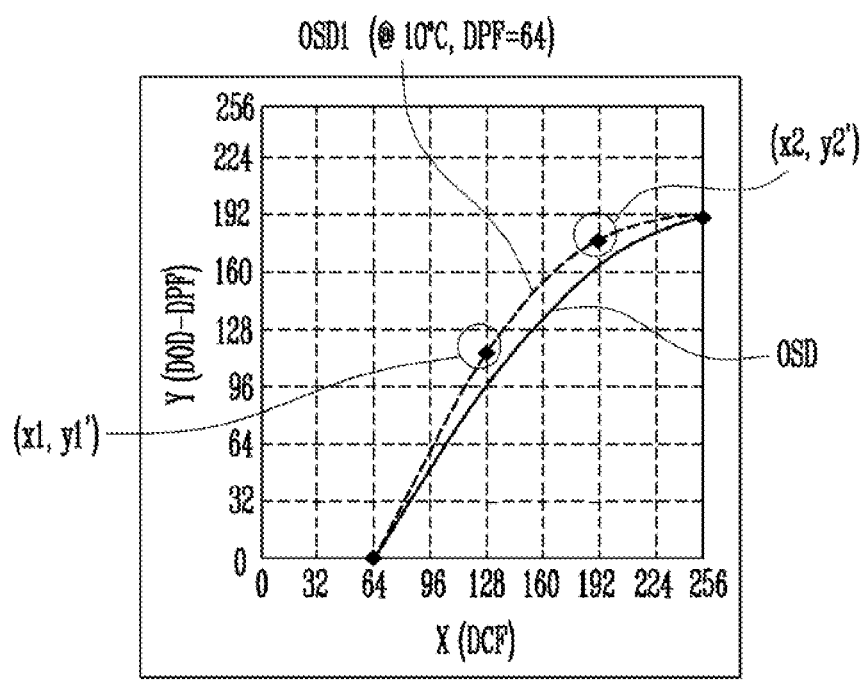
FIGS. 4A and 4B are diagrams illustrating an example of determining correction parameters according to a reference temperature.
Figure 4B:
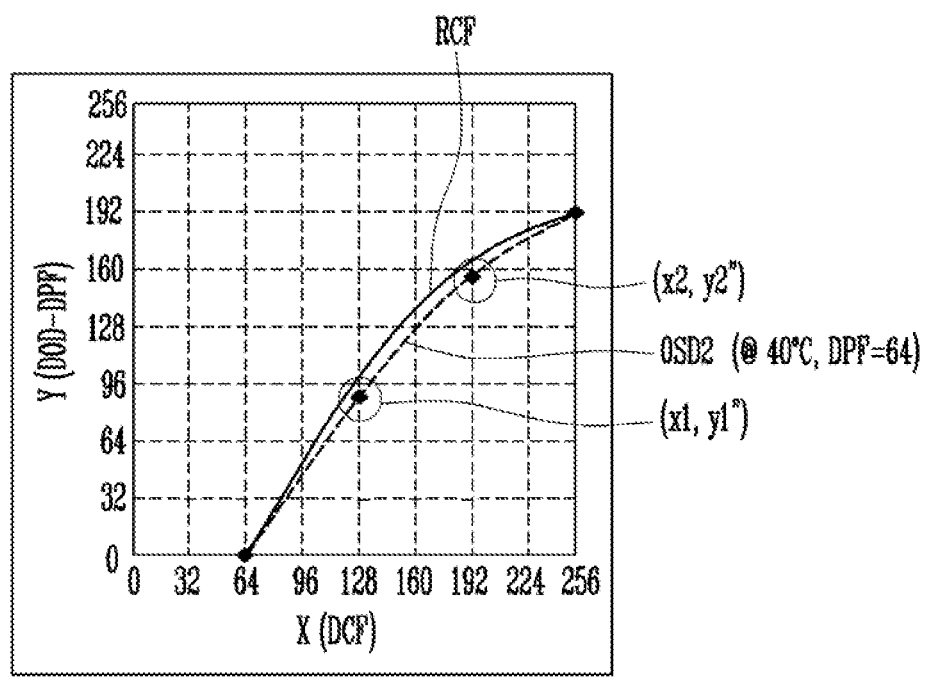
Figure 5:
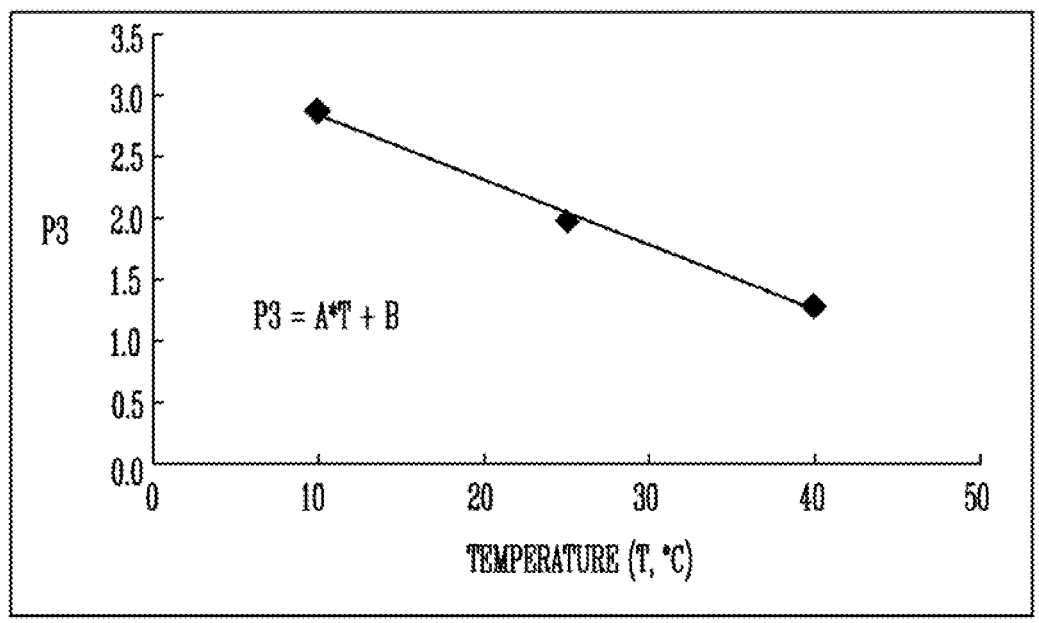
FIG. 5 is a diagram illustrating an example in which a third parameter is expressed as a temperature parameter.

FIGS. 4A and 4B are diagrams illustrating an example of determining correction parameters according to a reference temperature. FIG. 5 is a diagram illustrating an example in which the third parameter is expressed as a temperature parameter.

Referring to FIGS. 1, 3, 4A, 4B, and 5, a curve of the overdrive setting data OSD may be changed depending on a change in reference temperature.

As described above, for the same data voltage applied to a pixel, the response speed of liquid crystals varies depending on a temperature of liquid crystal molecules. Therefore, the overdrive grayscale may be more accurately applied by having different values depending on temperature. In an embodiment, under the condition of the same grayscale change, a variation of the data voltage according to the grayscale change may decrease when the temperature increases. Therefore, overdrive grayscales respectively corresponding to the first grayscale change and the second grayscale change may be determined as different values according to temperature.

As shown in FIGS. 4A and 4B, in this example a second reference temperature may be set as about 10° C., and a third reference temperature may be set as about 40° C. The reference grayscale DPF, the first and second default grayscales DF1 and DF2, the first and second default reference overdrive grayscales, the first current grayscale x1, and the second current grayscale x2 may not all change between the first to third reference temperatures. The first reference overdrive grayscale corresponding to the first current grayscale x1 and the second reference overdrive grayscale corresponding to the second current grayscale x2 may be stored as values determined through an experiment according to the reference temperature.

As shown in FIG. 4A, when the second reference temperature is 10° C., the overdrive grayscale DOD with respect to the first grayscale change and the second grayscale change may increase, and may be expressed by a first correction function OSD1. For example, an overdrive grayscale DOD corresponding to a change from the reference grayscale DPF to the first current grayscale x1 may increase further than that at the first reference temperature. Accordingly, a variation of the data voltage according to the grayscale change may increase as compared with the graph of FIG. 3.

As shown in FIG. 4B, when the third reference temperature is 40° C., the overdrive grayscale DOD with respect to the first grayscale change and the second grayscale change may decrease, and may be expressed by a second correction function OSD2. For example, an overdrive grayscale DOD corresponding to a change from the reference grayscale DPF to the first current grayscale x1 may decrease further than that at the first reference temperature. Accordingly, a variation of the data voltage according to the grayscale change may decrease as compared with the graph of FIG. 3.

The relationship between the functions of FIGS. 3 to 4B may be expressed by a function having temperature as a variable. In an embodiment, the first correction parameter P1, the second correction parameter P2, and the fourth correction parameter P4 may be determined as constants, and the third correction parameter P3 may be varied according to a sensed temperature. The first correction parameter P1, the second correction parameter P2, and the fourth correction parameter P4 are values derived from the overdrive setting data OSD with respect to the first reference temperature. Accordingly, the first correction function OSD1 and the second correction function OSD2 may be expressed by the following Equations 2 and 3, respectively.

$$Y=P1*X^3+P2*X^2+P3'*X+P4 \text{ (condition of } 10° \text{ C.).} \qquad \text{Equation 2:}$$

$$Y=P1*X^3+P2*X^2+P3''*X+P4 \text{ (condition of } 40° \text{ C.),} \qquad \text{Equation 3:}$$

where P3' and P3" are newly calculated third correction parameters, respectively.

As shown in FIG. 5, the third correction parameter P3 may be expressed by a linear function with temperature parameters (A and B) as coefficients and with temperature as a variable. The relationship between third correction parameters P3 at the first to third reference temperatures may approach a linear relationship. The relationship between P3, P3', and P3" respectively derived from Equations 1 to 3 may be expressed by a linear function such as the following Equation 4.

$$P3=A*T+B, \qquad \text{Equation 4:}$$

In Equation 4, P3 is a third correction parameter, T is a temperature variable, and A and B are temperature parameters. The third correction parameter P3 may be varied linearly with temperature (linearly determined corresponding to a temperature change).

Accordingly, the overdrive setting data OSD with respect to a grayscale change from a preset reference grayscale DPF may be used to calculate an optimum correction image data (overdrive grayscale), corresponding to all temperatures within a temperature range. For example, the overdrive setting data OSD may be expressed by the following Equation 5.

$$Y=P1*X^3+P2*X^2+(A*T+B)*X+P4. \qquad \text{Equation 5:}$$

In Eqn. 5, Y is a difference (DOD−DPF) between the overdrive grayscale DOD and the reference grayscale DPF; X is a grayscale value of the current image data; P1, P2, A, B, and P4 are constants; and T is a sensed temperature.

Thus, the overdrive grayscale DOD of the current image data may be calculated from the grayscale X of the current image data and the sensed temperature TD of FIG. 1 with respect to the preset grayscale (i.e., DPF) of the previous image data. A first parameter P1, a second parameter P2, temperature parameters A and B, and a fourth parameter P4 may be recorded in a memory of the liquid crystal display device 1000. For example, the overdrive setting data may be stored in the memory in the form of a lookup table.

As described above, the liquid crystal display device 1000 according to an embodiment of the present disclosure may extract overdrive setting data OSD and an overdrive grayscale DOD, which are optimized at all temperatures within a temperature range, through a simple process and a simple algorithm. Thus, lookup tables for temperature compensation are removed, and only a simple algorithm may be embedded in the memory. Accordingly, an amount of memory allocated for DCC driving may be reduced. Further, a measuring process for temperature compensation during the manufacturing process of the liquid crystal display device may be simplified, allowing for improved productivity.

Figure 6:
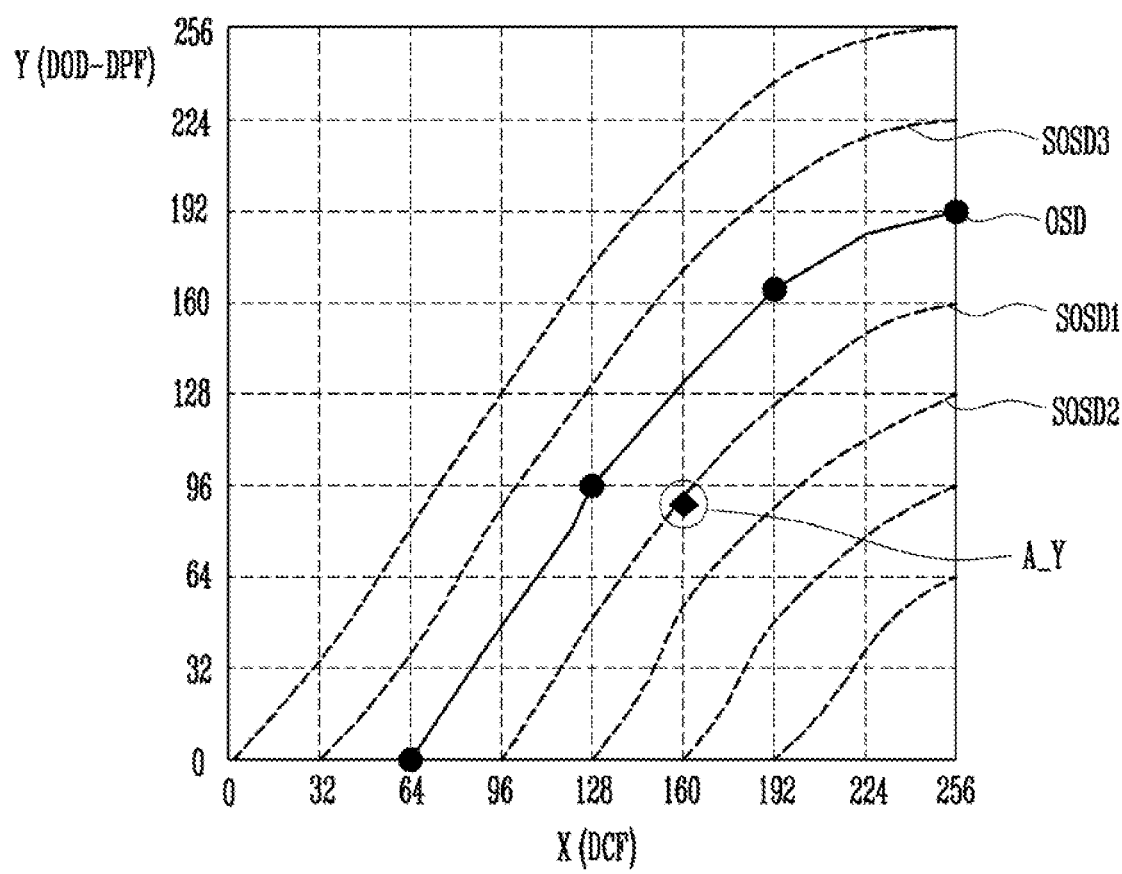
FIG. 6 is a diagram illustrating an example in which the overdrive setting data is shifted according to a reference grayscale.

FIG. 6 is a diagram illustrating an example in which the overdrive setting data is shifted according to a reference grayscale.

Referring to FIGS. 1 and 6, the overdrive setting data OSD may be shifted corresponding to a change in first reference grayscale DPF.

The first reference grayscale DPF may be a grayscale of previous image data. As an example to facilitate understanding, the first reference grayscale DPF corresponding to the overdrive setting data OSD may be set as the grayscale 64. Any other suitable value for the reference grayscale PDF may be alternatively set.

When the first reference grayscale DPF, i.e., the grayscale of the previous image data is not the grayscale 64, it may be desirable to correct the overdrive setting data OSD. Therefore, the overdrive setting data OSD may be shifted corresponding to a change in reference grayscale.

In an embodiment, a third grayscale change and an additional overdrive grayscale A_Y corresponding thereto may be stored in the image data corrector 500. The third grayscale change may correspond to a change from a second reference grayscale different from the first reference grayscale DPF to a preset third current grayscale. For example, as shown in FIG. 6, the first reference grayscale may be set as the grayscale 64, the first reference grayscale may be set as the grayscale 128, and the second current reference grayscale may be set as the grayscale 192. Accordingly, the overdrive setting data OSD of FIG. 6 may be calculated. In addition, the second reference grayscale may be set as the grayscale 96, and the third current grayscale may be set as the grayscale 160. The additional overdrive grayscale A_Y corresponding to the third grayscale change may be stored as a value determined through an experiment.

The image data corrector 500 may shift the overdrive setting data OSD in the form of a cubic function with respect to a new reference grayscale (e.g., SOSD1 of FIG. 6), based on a difference between the first reference grayscale and the second reference grayscale and a difference between an overdrive grayscale generated by the overdrive setting data OSD and the additional overdrive grayscale A_Y. When the reference grayscale DCF is the grayscale 96, a first shifted overdrive setting data SOSD1 may be derived. When the reference grayscale DCF is the grayscale 128, a second shifted overdrive setting data SOSD2 may be derived by a shift of the overdrive setting data OSD. When the reference grayscale DCF is grayscale 32, a third shifted overdrive setting data SOSD3 may be derived by a shift of the overdrive setting data OSD.

As described above, image data correction using DCC with respect to the entire grayscale range (e.g., the 256×256 combination) can be performed by shifting the overdrive setting data OSD, based on the additional overdrive grayscale A_Y. Further, each of the shifted correction functions includes calculated temperature parameters, and thus the overdriven grayscale value can be dynamically calculated according to a sensed temperature.

Figure 7:
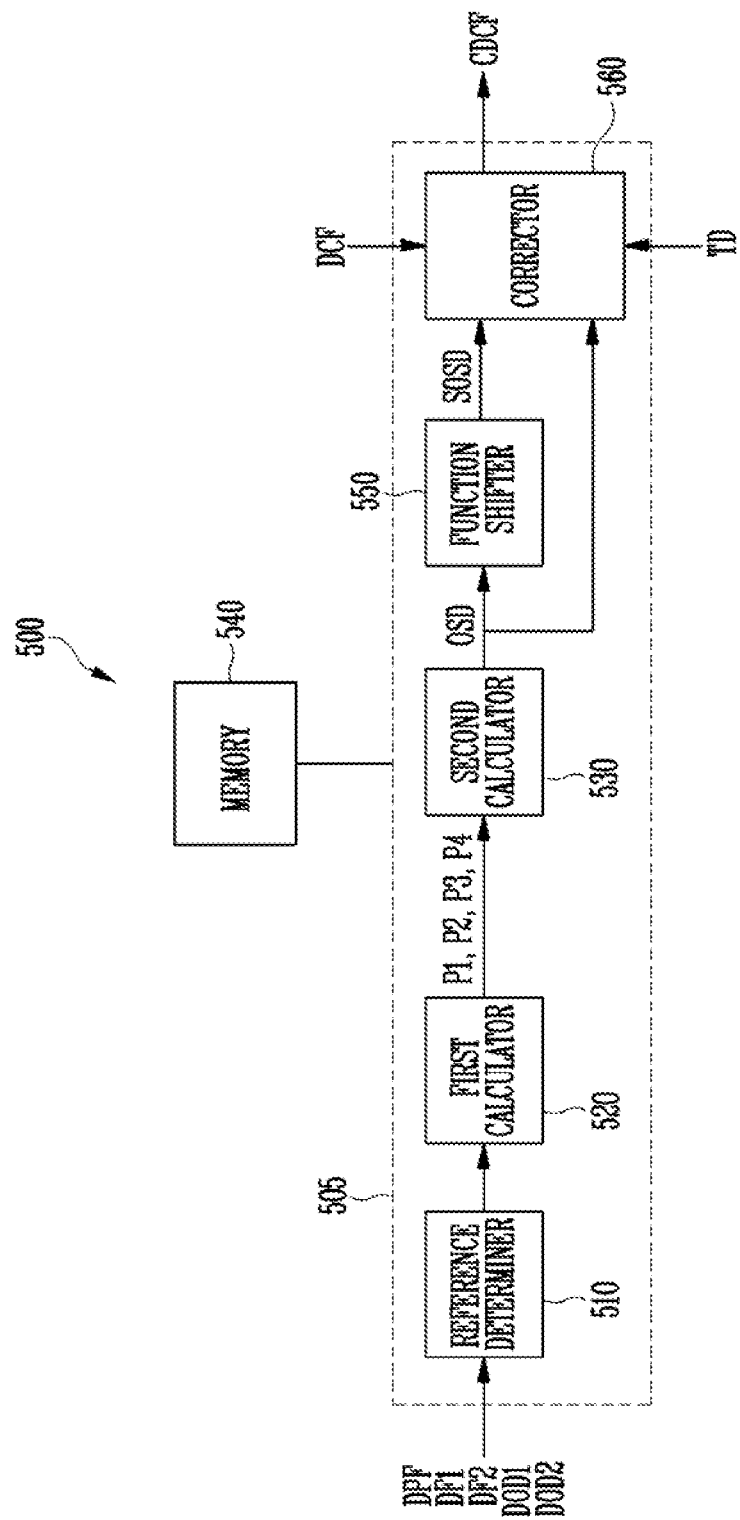
FIG. 7 is a block diagram illustrating an example of an image data corrector included in the liquid crystal display device of FIG. 1.

FIG. 7 is a block diagram illustrating an example of the image data corrector included in the liquid crystal display device of FIG. 1.

Referring to FIGS. 1 to 7, the image data corrector 500 (interchangeably, "image data corrector circuit") may include a correction circuit 505 coupled to a memory 540. The correction circuit 505 may include a reference determiner 510, a first calculator 520, a function shifter, a second calculator 530, and a corrector 560, each of which may be embodied as logic or processing circuitry (and each of which may be alternatively referred to as a "circuit"), For instance, one or more general purpose processors may be programmed to form processing circuitry that performs the operations of the correction circuit 505. The one or more processors may read instructions from the memory 540 (which is a non-transitory storage medium) and execute the instructions to carry out the operations of correction circuit 505. It is noted, depending on a particular embodiment variation, one or more of the elements shown in FIG. 7 may be omitted, and other elements not shown may be added as needed.

The reference determiner 510 may determine a reference grayscale DPF and two default grayscales DF1 and DF2 corresponding to the reference grayscale DPF, and determine reference overdrive grayscales DOD1 and DOD2 respectively corresponding to a first grayscale change and a second grayscale change with respect to each of preset first to third reference temperatures. The determined values may be values determined by an experiment, and may be input through an external input means such as a graphical user interface (GUI), an audio interface, etc. In an embodiment, the determined values may be recorded in the memory 540.

The first calculator 520 may calculate first to fourth correction parameters P1 to P4 included in overdrive setting data OSD, based on a change from the reference grayscale DPF to the default grayscales DF1 and DF2 at the first reference temperature, the first grayscale change, and the second grayscale change. In an embodiment, the overdrive setting data OSD may be calculated in the form of a cubic function that uses the first to fourth correction parameters P1 to P4 as coefficients of respective terms thereof and uses a current grayscale DCF of current image data as a variable.

In an embodiment, the first correction parameter P1, the second correction parameter P2, and the fourth correction parameter P4 may be determined as constants, and the third correction parameter P3 may be calculated in the form of a function that varies linearly with temperature (a icy linear function).

The second calculator 530 may calculate the third correction parameter P3 in the form of a linear function with respect to temperature, which has temperature parameters (represented as A and B in FIG. 5) as coefficients of respective terms thereof. The second calculator 530 may calculate the third correction parameter P3, based on the reference overdrive grayscales of the respective first and second grayscale changes corresponding to the second reference temperature. Also, the second calculator 530 may calculate the third correction parameter P3, based on the reference overdrive grayscales of the respective first and second grayscale changes corresponding to the third reference temperature. The third correction parameter P3 may be calculated as different values according to reference temperature.

The second calculator 530 may calculate temperature parameters (represented as A and B in FIG. 5), based on a relationship between a temperature change and a change in the third correction parameter P3. The third correction parameter P3 may be expressed by a linear function including the temperature parameters. Accordingly, the overdrive setting data OSD may be computed using the current grayscale DCF of the current image data X and the temperature T as variables.

The first, second, and fourth correction parameters P1, P2, and P4 and the temperature parameters may be stored in the memory 540.

The function shifter 550 may shift the overdrive setting data OSD, based on a difference between an additional overdrive grayscale (see FIG. 6) corresponding to a third grayscale change and the overdrive setting data OSD. Overdrive grayscales with respect to combinations of all grayscales may be calculated through function shift driving. The shifted overdrive setting data SOSD or the overdrive setting data OSD may be provided to the corrector 560.

The corrector 560 may generate correction image data CDCF by applying a sensed temperature TD and the current image data (e.g., the grayscale DCF of the current image data) to the overdrive setting data OSD or the shifted overdrive setting data SOSD. One of the overdrive setting data OSD or the shifted overdrive setting data SOSD may be selected by a grayscale (reference grayscale) of previous image data.

The operation and function of the image data corrector 500 have been described in detail with reference to FIGS. 3 to 6, and therefore redundant description thereof will be omitted.

Figure 8:
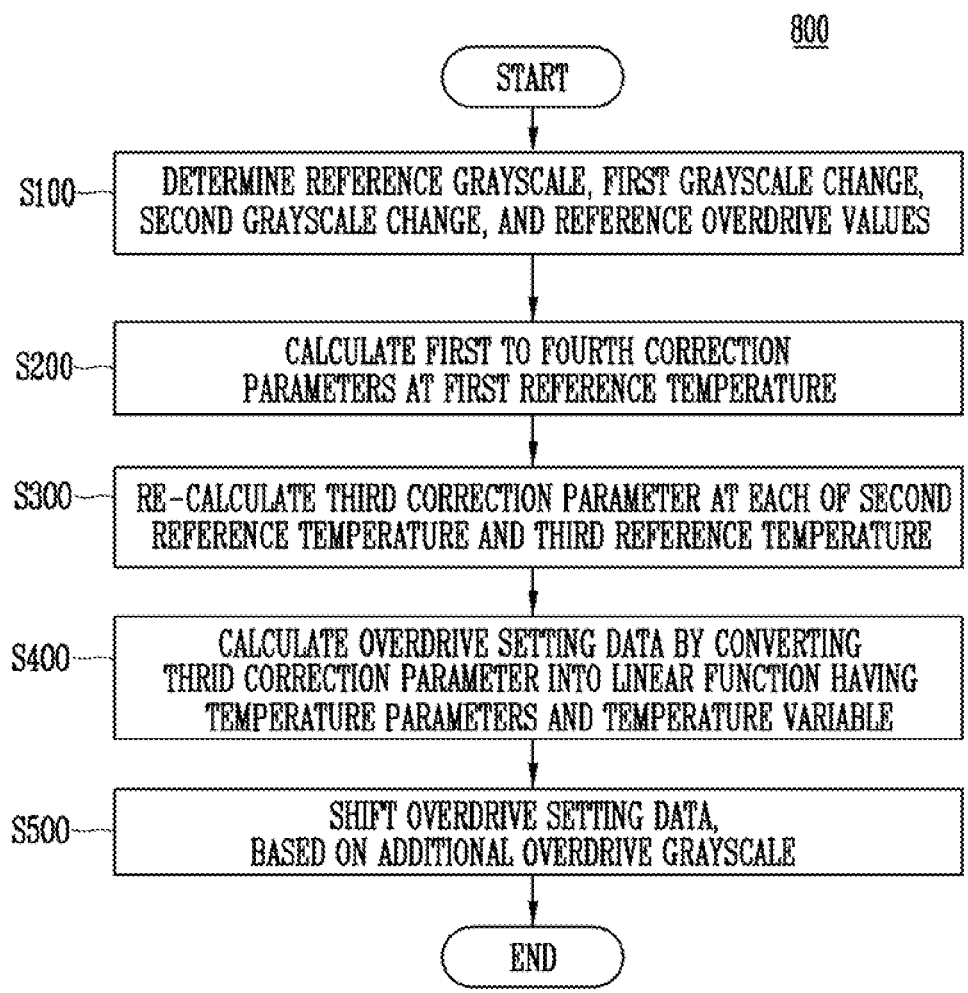
FIG. 8 is a flowchart illustrating a method for driving the liquid crystal display device according to an embodiment of the present disclosure.

FIG. 8 is a flowchart illustrating a method, 800, for driving the liquid crystal display device according to an embodiment of the present disclosure. The method 800 may be performed by one or more processors (e.g., the correction circuit 505 of FIG. 7) and include the following operations: determining a reference grayscale and two default grayscales corresponding to the reference grayscale, and determining reference overdrive grayscales respectively corresponding to a first grayscale change and a second grayscale change from the reference grayscale with respect to each of preset first to third reference temperatures (S100); calculating first to fourth correction parameters, based on reference overdrive grayscales corresponding to the first reference temperature (S200); re-calculating a third correction parameter at each of the second reference temperature and the third reference temperature, based on reference overdrive grayscales respectively corresponding to the second reference temperature and the third reference temperature, the first correction parameter, the second correction parameter, and the fourth correction parameter (S300); and calculating overdrive setting data for correcting a grayscale value of current image data by converting the third parameter of each of the first to third reference temperatures into a linear function with respect to temperature having temperature parameters as coefficients (S400). The method 800 may further include shifting the overdrive setting data, based on a difference between an additional overdrive grayscale corresponding to a third grayscale change and the overdrive setting data (S500).

In an embodiment, the overdrive setting data and the shifted overdrive setting data may be stored in a memory of the liquid crystal display device. For example, the overdrive setting data and the shifted overdrive setting data may be stored as a plurality of lookup tables. In another embodiment, only the overdrive setting data may be stored in the memory, and not the shifted overdrive setting data, and a correction function may be shifted in real time according to previous image data and a shift algorithm.

The overdrive setting data may be calculated in the form of a cubic function for calculating an overdrive grayscale, which has the first to fourth correction parameters as coefficients and has the current image data (e.g., the grayscale value of the current image data) as a variable. The first, second, and fourth correction parameters may be constants, and the third correction parameter may be expressed by a linear function having temperature parameters and a temperature variable.

In an embodiment, the process of calculating the overdrive setting data may be performed during a manufacturing process of the liquid crystal display device. Further, the overdrive setting data may be re-calculated according to a user setting during use of the LCD device. In another embodiment, the overdrive setting data may be initially calculated according to a user setting during the use of the liquid crystal display device.

Figure 9:
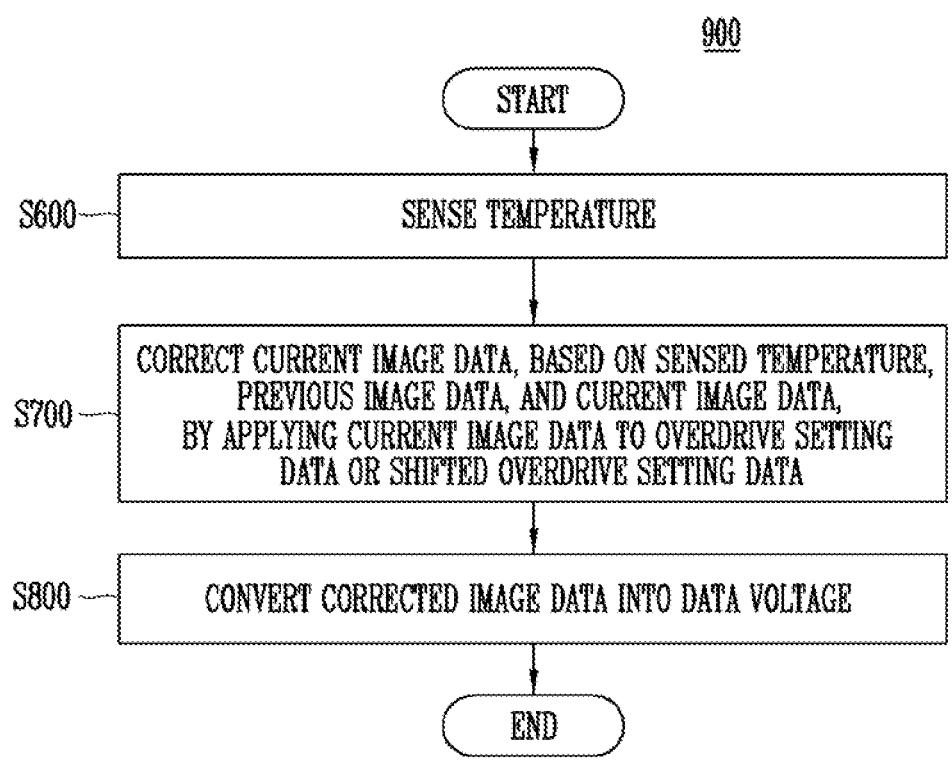
FIG. 9 is a flowchart illustrating an example method or correcting image data according to an embodiment.

FIG. 9 is a flowchart illustrating an example method, 900, for correcting image data according to the inventive concept. As shown in FIG. 9, the method 900 may include: sensing a temperature (S600); correcting the current image data to have an overdrive grayscale by applying current image data to overdrive setting data or shifted overdrive setting data (S700); and converting the corrected image data into a data voltage (S800). Accordingly, an image based on an overdriven data voltage may be displayed.

Under the same grayscale change condition, a variation of the data voltage according to a grayscale change may decrease when the sensed temperature increases. That is, an amount of overdrive may decrease when the sensed temperature increases.

Since the method for calculating the overdrive setting data and the method for correcting the image data have been described in detail with reference to FIGS. 3 to 7, redundant description thereof have been omitted from the discussion of FIGS. 8 and 9.

As described above, in a liquid crystal display device and methods for driving the same according to the present disclosure, an optimum overdrive grayscale (and an optimum overdrive data voltage) may be dynamically calculated according to a temperature change and a grayscale change, using only a reference overdrive grayscale determined through previous measurements, e.g., measurements performed ten times or less. Thus, lookup tables for temperature compensation may be omitted, and only a simple algorithm may be embedded in the LCD device memory. Accordingly, the amount of memory allocated to a DCC driving function may be reduced, thereby freeing up memory for other applications or reducing overall memory capacity. Further, image data optimized at all temperatures within a temperature range may be corrected by calculating a parameter that varies linearly with temperature. Further, a measuring process for temperature compensation during the manufacturing process of the liquid crystal display device may be significantly simplified, resulting in improved productivity.

Various elements described above have been described with labels consistent with their functionality, but are embodied with hardware circuitry. In this regard, elements such as the above-discussed data driver, gate driver, image data corrector, controller, reference determiner, first and second calculators, function shifter, and corrector may be alternatively called a data driver circuit, image data corrector circuit, . . . , corrector circuit, respectively.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A liquid crystal display device comprising:
a display panel including a plurality of pixels for displaying an image;
a temperature sensor configured to sense temperature;
an image data corrector circuit configured to calculate correction parameters based on a grayscale change, calculate temperature parameters based on preset reference temperatures and the correction parameters, and correct current image data to thereby provide corrected current image data based on the correction parameters and the temperature parameters; and
a data driver configured to convert the corrected current image data into a data voltage and supply the data voltage to the display panel,
wherein at least one of the correction parameters has a value that varies linearly with the sensed temperature and is based in part on the temperature parameters, and
the corrected current image data is generated based on overdrive setting data computed through a cubic function that uses the correction parameters as coefficients and the current image data as a variable.

2. The liquid crystal display device of claim 1, wherein, under the same grayscale change condition, a variation of the data voltage according to the grayscale change decreases when the sensed temperature increases.

3. The liquid crystal display device of claim 1, wherein the overdrive setting data "Y" is computed through the cubic function as:

$$Y = P1*X^3 + P2*X^2 + P3*X + P4,$$

where Y is a difference (DOD-DPF) between an overdrive grayscale DOD and a reference grayscale DPF, X is a grayscale value of current image data, and P1, P2, P3, and P4 are the correction parameters.

4. A liquid crystal display device comprising:
a display panel including a plurality of pixels for displaying an image;
a temperature sensor configured to sense temperature;
an image data corrector circuit configured to calculate correction parameters based on a grayscale change, calculate temperature parameters based on preset reference temperatures and the correction parameters, and correct current image data to thereby provide corrected current image data based on the correction parameters and the temperature parameters; and
a data driver configured to convert the corrected current image data into a data voltage and supply the data voltage to the display panel,
wherein at least one of the correction parameters has a value that varies linearly with the sensed temperature and is based in part on the temperature parameters,
wherein the image data corrector circuit includes:
a reference determiner circuit configured to determine a reference grayscale and two default grayscales corresponding to the reference grayscale, and determine reference overdrive grayscales respectively corresponding to a first grayscale change and a second grayscale change with respect to each of preset first to third reference temperatures;
a first calculator circuit configured to calculate first to fourth correction parameters included in the overdrive setting data, based on a change from the reference grayscale to the default grayscales, the first grayscale change, and the second grayscale change, at the first reference temperature; and
a second calculator circuit configured to convert the third correction parameter into a linear function with respect to temperature, the linear function including the temperature parameters as coefficients.

5. The liquid crystal display device of claim 4, wherein the first correction parameter, the second correction parameter, and the fourth correction parameter are determined as constants,
wherein the third correction parameter varies linearly with the sensed temperature.

6. The liquid crystal display device of claim 5, wherein the first grayscale change corresponds to a change from the reference grayscale corresponding to previous image data, to a preset first current grayscale, and
the second grayscale change corresponds to a change from the reference grayscale to a second current grayscale different from the first current grayscale.

7. The liquid crystal display device of claim 4, wherein the second calculator circuit is configured to:
calculate the third correction parameter, based on the reference overdrive grayscales of the first and second grayscale changes corresponding to each of the second and third reference temperatures; and
calculate the temperature parameters, based on a relationship between changes of the third correction parameter depending on temperature.

8. The liquid crystal display device of claim 4, wherein the corrected image data is calculated based on the overdrive setting data, the overdrive setting data being computed through a cubic function that uses, as a coefficient, the third correction parameter derived from the first, second, and fourth correction parameters and the temperature parameters, and uses the current image data and the sensed temperature as variables.

9. The liquid crystal display device of claim 8, wherein the image data corrector further includes:
a corrector circuit configured to generate the corrected image data by applying the sensed temperature and the current image data to the overdrive setting data.

10. The liquid crystal display device of claim 4, wherein the image data corrector circuit further includes:
a memory configured to store the first, second, and fourth correction parameters and the temperature parameters.

11. The liquid crystal display device of claim 10, wherein the memory stores an additional overdrive grayscale corresponding to a third grayscale change.

12. The liquid crystal display device of claim 11, wherein the third grayscale change corresponds to a change from a second reference grayscale different from the first reference grayscale to a preset third current grayscale.

13. The liquid crystal display device of claim 12, wherein the image data corrector circuit further includes:
a function shifter circuit configured to shift the overdrive setting data, based on a difference between the first reference grayscale and the second reference grayscale and a difference between an overdrive grayscale generated by the overdrive setting data and the additional overdrive grayscale.

14. The liquid crystal display device of claim 4, wherein the default grayscales are a first default grayscale equal to the reference grayscale and a second default grayscale that is a maximum grayscale of the display panel, and
wherein the reference overdrive grayscales with respect to the default grayscales are equal to the first and second default grayscales, respectively.

15. A non-transitory computer-readable recording medium storing instructions that, when executed by at least one processor, implement a method for driving a liquid crystal display device, the method comprising:
determining a reference grayscale and two default grayscales corresponding to the reference grayscale, and determining reference overdrive grayscales respectively corresponding to a first grayscale change from the reference grayscale and a second grayscale change from the reference grayscale with respect to each of preset first to third reference temperatures;
calculating first to fourth correction parameters included in a function to compute overdrive setting data, based on the reference overdrive grayscales corresponding to the first reference temperature;
re-calculating the third correction parameter at each of the second reference temperature and the third reference temperature, based on the reference overdrive grayscales corresponding to each of the second reference temperature and the third reference temperature, the first correction parameter, the second correction parameter, and the fourth correction parameter; and
calculating the overdrive setting data for correcting current image data by converting the third parameter at each of the first to third reference temperatures into a linear function with respect to temperature, the linear function including temperature parameters as coefficients.

16. A method for driving a liquid crystal display device, the method comprising:
determining a reference grayscale and two default grayscales corresponding to the reference grayscale, and determining reference overdrive grayscales respectively corresponding to a first grayscale change from the reference grayscale and a second grayscale change from the reference grayscale with respect to each of preset first to third reference temperatures;
calculating first to fourth correction parameters included in a function to compute overdrive setting data, based on the reference overdrive grayscales corresponding to the first reference temperature;
re-calculating the third correction parameter at each of the second reference temperature and the third reference temperature, based on the reference overdrive grayscales corresponding to each of the second reference temperature and the third reference temperature, the first correction parameter, the second correction parameter, and the fourth correction parameter; and
calculating the overdrive setting data for correcting current image data by converting the third parameter at each of the first to third reference temperatures into a linear function with respect to temperature, the linear function including temperature parameters as coefficients.

17. The method of claim 16, wherein the first correction parameter, the second correction parameter, and the fourth correction parameter are constants unchanged by a temperature change, and the overdrive setting data is calculated in the form of a cubic function having the current image data as a variable.

18. The method of claim 16, further comprising:
shifting the overdrive setting data, based on a difference between an additional overdrive grayscale corresponding to a third grayscale change and an overdrive grayscale generated by the overdrive setting data.

19. The method of claim 16, further comprising:
sensing a temperature;
generating correction image data by applying the sensed temperature, previous image data, and current image data to the overdrive setting data; and
converting the correction image data into a data voltage.

20. The method of claim 19, wherein, under the same grayscale change condition, a variation of the data voltage according to the grayscale change decreases when the sensed temperature increases.

* * * * *